United States Patent [19]
Fletcher

[11] Patent Number: 6,036,561
[45] Date of Patent: Mar. 14, 2000

[54] WAKEBOARD WRAP

[75] Inventor: Herbert E. Fletcher, San Clemente, Calif.

[73] Assignee: Astrodeck, Inc., San Clemente, Calif.

[21] Appl. No.: 09/069,649

[22] Filed: Apr. 29, 1998

[51] Int. Cl.$^7$ .................................................. B63B 35/85
[52] U.S. Cl. ............................................................ 441/70
[58] Field of Search ............................ 114/39.2; 441/68, 441/70, 74, 65; 280/607, 617, 618

[56] References Cited

U.S. PATENT DOCUMENTS

| | | | |
|---|---|---|---|
| 4,869,697 | 9/1989 | Ackert et al. | 441/70 |
| 4,891,027 | 1/1990 | Plunkett | 441/70 |
| 5,624,291 | 4/1997 | McClaskey | 441/70 |

*Primary Examiner*—Ed Swinehart
*Attorney, Agent, or Firm*—Pillsbury Madison & Sutro LLP

[57] ABSTRACT

A wrap for use with a binding attached to a wakeboard has a layered structure of lightweight materials. The wrap includes a toe portion and a heel portion, which define a generally boot-shaped structure. The layered structure of lightweight materials includes first and second layers of foam rubber and a layer of plastic foam joined together. The layered structure of lightweight materials further includes a layer of material for substantially preventing tearing of the wrap joined together with the first and second layers of foam rubber and the layer of plastic foam. The toe and heel portions are first and second separable members.

10 Claims, 2 Drawing Sheets

WAKEBOARD WRAP

FIELD OF THE INVENTION

This invention relates to wakeboard wraps, and, in particular embodiments, wraps for use with bindings attached to wakeboards or water ski boards.

BACKGROUND OF THE INVENTION

Generally, the sport of wakeboarding is similar to water skiing. A user rides on a wakeboard behind a boat and attempts to performs tricks and stunts, usually in the air. A wakeboard is a single board that resembles a smaller version of a surfboard. Like water skis, wakeboards utilize a binding for securing the user to the wakeboard.

Traditionally, bindings attached to wakeboards have used toe and heel wraps made from one layer of neoprene foam rubber and one layer of neoprene rubber laminated together. However, these wraps are heavy, resulting in bindings and wakeboards that are heavy. Thus, it is difficult for users to perform tricks and to jump out of the water while wakeboarding. Additionally, these wraps are subject to tearing when pulled on during use.

SUMMARY OF THE DISCLOSURE

It is an object of an embodiment of the present invention to provide an improved wrap or grip for use with a binding attached to a wakeboard, which obviates for practical purposes, the above mentioned limitations.

According to an embodiment of the present invention, a wrap for use with a binding attached to a wakeboard has a layered structure of lightweight materials. The wrap includes a toe portion and a heel portion, which define a generally boot-shaped structure. In particular embodiments of the present invention, the layered structure of lightweight materials includes first and second layers of foam rubber and a layer of plastic foam joined together. In other embodiments of the present invention, the layered structure of lightweight materials further includes a layer of material for substantially preventing tearing of the wrap joined together with the first and second layers of foam rubber and the layer of plastic foam. In yet other embodiments of the present invention, the toe and heel portions are first and second separable members.

In another embodiment of the present invention, a boot-shaped wrap for use with a binding attached to a wakeboard includes at least one layer of a first lightweight material and at least one layer of a second different lightweight material joined together in a generally flexible configuration. In particular embodiments of the present invention, the wrap further includes at least one layer of material for substantially preventing tearing of the wrap joined together with the layers of the first lightweight material and the second lightweight material.

Other features and advantages of the invention will become apparent from the following detailed description, taken in conjunction with the accompanying drawings, which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
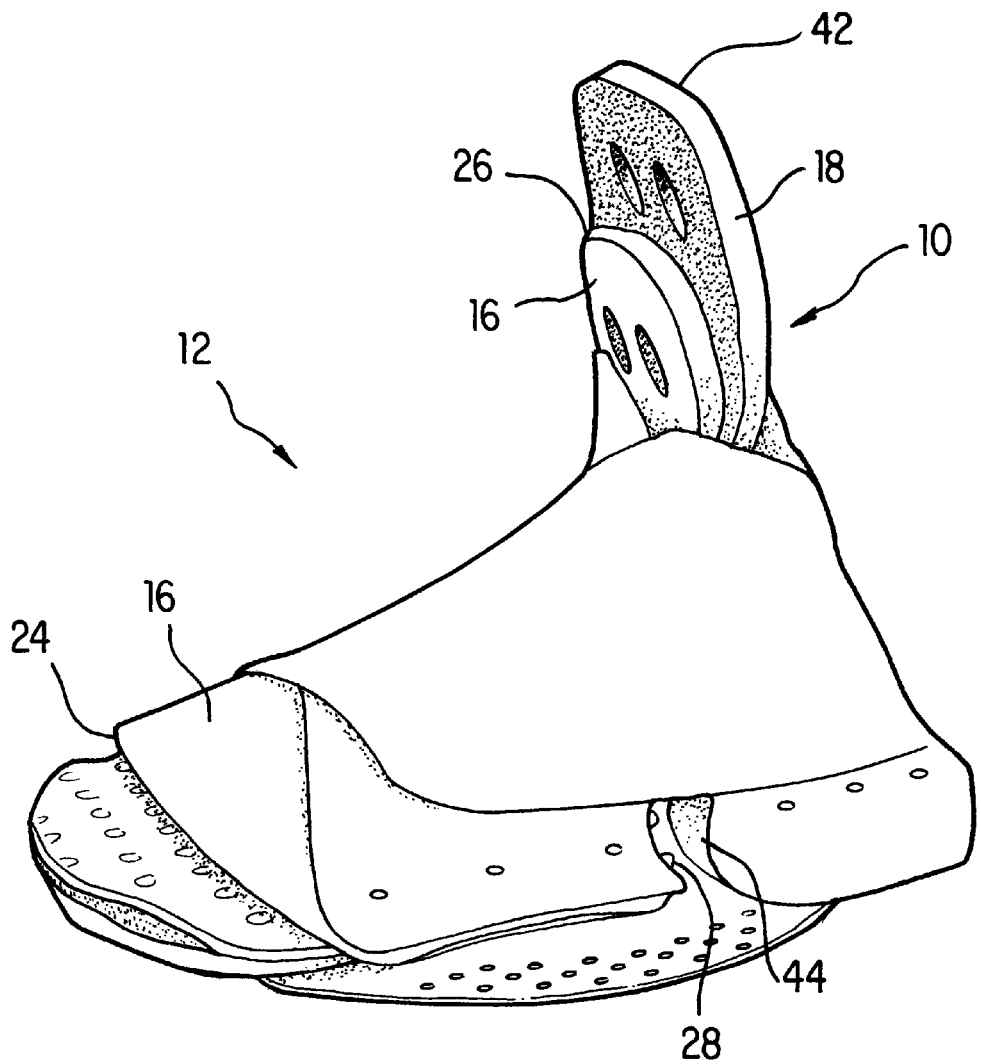
FIG. 1 is a perspective view of a wrap used with a wakeboard binding in accordance with an embodiment of the present invention.

As shown in the drawings for purposes of illustration, the invention is embodied in a wrap. In preferred embodiments of the present invention, the wrap is used with a binding attached to a wakeboard. However, it will be recognized that further embodiments of the invention may be used with bindings attached to other types of boards, such as water ski boards or the like.

FIG. 1 shows a wrap 10 used with a wakeboard binding 12 in accordance with an embodiment of the present invention. In preferred embodiments, the wrap 10 in the binding 12 defines a generally high cut, boot-shaped structure. When a user puts on the binding 12, the wrap 10 covers the lower portion of the user's leg, including the ankle and extending as far as about the mid-calf Such a structure is preferred because it provides strong support for the user's foot and ankle and facilitates the user's control of the wakeboard. However, in alternative embodiments, the wrap 10 may define a generally mid-cut, or low cut, boot-shaped structure. In further alternative embodiments, the wrap 10 may define other structures, such as a sandal-type structure with straps, or the like.

Referring to FIG. 1, the wrap 10 has a toe portion 16 and a heel portion 18. In preferred embodiments, the wrap 10 is formed from first and second separable members. The first member defines the toe portion 16, and the second member defines the heel portion 18. However, in alternative embodiments, the wrap 10 may be formed from a single contiguous member, or alternatively, from more than two separable members.

Figure 2:
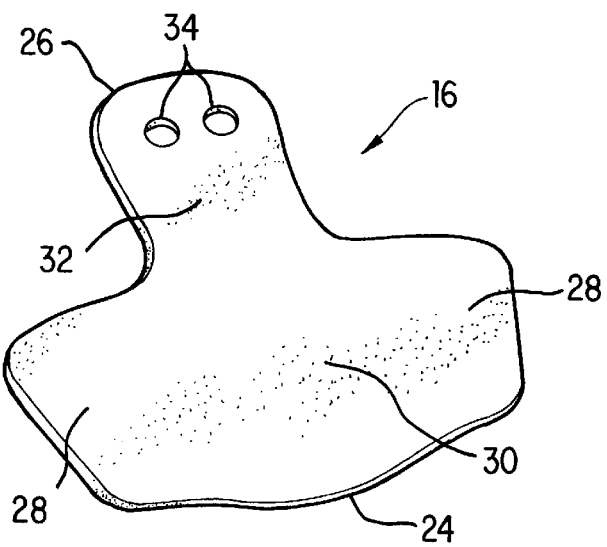
FIG. 2 is an exploded perspective view of a toe portion of the wrap in accordance with an embodiment of the present invention.

FIG. 2 illustrates the first member or toe portion 16 in accordance with an embodiment of the present invention. In preferred embodiments, the toe portion 16 is a generally "T"-shaped member formed from a horizontal portion 30 and a vertical portion 32. The toe portion 16 has a first end 24, a second end 26, and flaps 28. In the binding 12, the horizontal portion 30 rests on top of the user's foot, extending lengthwise from about the user's toes to about the user's heel. The first end 24 is adjacent the user's toes. The flaps 28 bend downward and abut against both sides of the user's foot, adjacent the user's arch. The vertical portion 32 bends upward and abuts against the lower front portion of the user's leg, extending lengthwise from about the user's ankle to about the user's mid-calf. The second end 26 is adjacent the user's mid-calf. In alternative embodiments, the length of the vertical portion 32 may be shortened so that the vertical portion 32 extends lengthwise from about the user's ankle to about the bottom of the user's calf, thus defining a mid-cut, boot-shaped structure. In further alternative embodiments, the vertical portion 32 may be omitted, thus defining a low-cut, boot-shaped structure. In yet other alternative embodiments, the length of the horizontal portion 30 may be shortened and the vertical portion 32 may be substantially omitted, thus defining a toe strap for a sandal-type structure.

Figure 3:
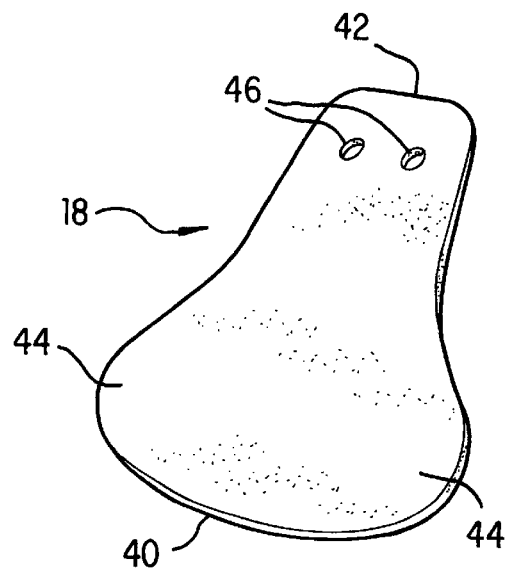
FIG. 3 is an exploded perspective view of a heel portion of the wrap in accordance with an embodiment of the present invention.

FIG. 3 illustrates the second member or heel portion 18 in accordance with an embodiment of the present invention. In preferred embodiments, the heel portion 18 is a generally bulb-shaped member with a first end 40, a second end 42, and flaps 44. In the binding 12, the heel portion 18 abuts against the lower back portion of the user's leg, extending lengthwise from about the user's heel to about the user's mid-calf. The first end 40 is adjacent the user's heel, and the second end 42 is adjacent the user's mid-calf. The flaps 44 bend inward and abut against both sides of the user's heel, thus creating a heel pocket. In alternative embodiments, the length of the heel portion 18 may be shortened so that the heel portion 18 extends lengthwise from about the user's heel to about the bottom of the user's calf or about the user's ankle, thus defining a mid-cut, or low-cut, boot-shaped structure or a sandal-type structure.

Referring to FIGS. 2 and 3, the toe portion 16 and the heel portion 18 each has a pair of holes, 34 and 46, respectively, adjacent the second end, 26 and 42, respectively. The user's fingers can be inserted into the holes 34 and 46 to facilitate pulling on the binding 12. In alternative embodiments, the toe portion 16 and the heel portion 18 each may have other quantities of holes, such as one hole in the toe portion 16 and one hole in the heel portion 18, two holes in the toe portion 16 and three holes in the heel portion 18, or the like. In further alternative embodiments, the holes 34 and 46 may be omitted.

Figure 4:
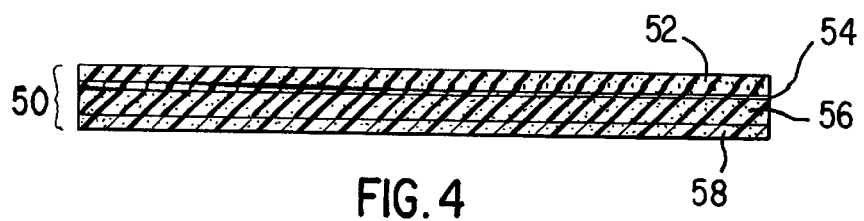
FIG. 4 is an exploded side plan view of a layered structure of the wrap in accordance with an embodiment of the present invention.

As shown in FIG. 4, the wrap 10 is formed from a layered structure of lightweight materials 50. In preferred embodiments, the layered structure 50 includes at least one layer of a first lightweight material and at least one layer of a second different lightweight material joined together in a generally flexible configuration. In the illustrated embodiment, the layered structure 50 includes first and second layers of foam rubber or neoprene 52 and 56, and one layer of high density plastic or rubber foam 58. As shown in FIGS. 1 and 4, the first layer of foam rubber 52 forms the outer surface of the layered structure 50, and the layer of plastic foam 58 forms the inner surface of the layered structure 50. The second layer of foam rubber 56 is disposed between the first layer of foam rubber 52 and the layer of plastic foam 58. In the binding 12, the layer of plastic foam 58 is adjacent portions of the user's foot and leg. Materials such as foam rubber for layers 52 and 56 and plastic foam for layer 58 are preferred because they result in lightweight bindings 12, which make it easier to jump out of the water while wakeboarding. Additionally, the layer of plastic foam 58 is soft and flexible, substantially conforming to the shape of the user's foot after only a few uses. Some materials that may be used for the layer of plastic foam 58 include polystyrene and polyurethanes, as well as various flexible rubbers, such as neoprene, ABS, and the like. However, ethylene vinyl acetate is preferred. In alternative embodiments, other materials may be used for layers 52, 56, and 58, such as yet other rubbers, plastics, or the like. In preferred embodiments, the layered structure 50 also includes at least one layer of material for substantially preventing tearing of the wrap. In the illustrated embodiment, the layered structure 50 also includes one layer of material 54, such as nylon or polypropylene, for substantially preventing tearing of the wrap 10. The layer of material 54 is laminated between the first and second layers of foam rubber 52 and 56, and the layer of high density foam 58 is disposed adjacent the second layer of foam rubber 56. In alternative embodiments, the layer of material 54 may be made of other materials, such as rubber, plastics, or the like. In further alternative embodiments, the layer of material 54 may be disposed between the first and second layers of foam rubber 52 and 56 using adhesives, fasteners, or the like. In further alternative embodiments, the layered structure may include other quantities of layers of foam rubber, foam, and nylon, such as three layers of foam rubber, two layers of foam, and two layers of nylon, or the like. In yet other alternative embodiments, the layer of nylon may be omitted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wrap for use with a binding attached to a wakeboard, the wrap comprising:
   a toe portion; and
   a heel portion;
   wherein the toe and heel portions are formed from a layered structure of lightweight materials comprising:
   first and second layers of foam rubber; and
   a layer of plastic foam joined together with the first and second layers of foam rubber;
   and further wherein the toe and heel portions define a generally boot-shaped structure.

2. The wrap of claim 1, wherein the layered structure of lightweight materials further comprises a layer of material for substantially preventing tearing of the wrap joined together with the first and second layers of foam rubber and the layer of plastic foam.

3. The wrap of claim 2, wherein the material for substantially preventing tearing of the wrap is nylon.

4. The wrap of claim 2, wherein the material for substantially preventing tearing of the wrap is polypropylene.

5. A boot-shaped wrap for use with a binding attached to a wakeboard, the wrap comprising:
   at least one layer of foam rubber; and
   at least one layer of plastic foam;
   wherein the at least one layer of foam rubber and the at least one layer of plastic foam are joined together in a generally flexible configuration.

6. A boot-shaped wrap for use with a binding attached to a wakeboard, the wrap comprising:
   at least one layer of a first lightweight material;
   at least one layer of a second lightweight material; and
   at least one layer of material for substantially preventing tearing of the wrap;
   wherein the at least one layer of the first lightweight material, the at least one layer of the second lightweight material, and the at least one layer of material for substantially preventing tearing of the wrap are joined together in a generally flexible configuration.

7. The wrap of claim 6, wherein the material for substantially preventing tearing of the wrap is nylon.

8. The wrap of claim 6, wherein the material for substantially preventing tearing of the wrap is polypropylene.

9. A boot-shaped wrap for use with a binding attached to a wakeboard, the wrap comprising:
   first and second layers of foam rubber; and
   a layer of plastic foam disposed adjacent to the second layer of foam rubber;
   wherein the first and second layers of foam rubber and the layer of plastic foam are joined together in a generally flexible configuration.

10. The wrap of claim 9, wherein the wrap further comprises a layer of nylon or polypropylene disposed between the first and second layers of foam rubber.

* * * * *